Oct. 26, 1926.  
E. W. DAVIS  
LUBRICANT COMPRESSOR  
Filed April 27, 1923  
1,604,392
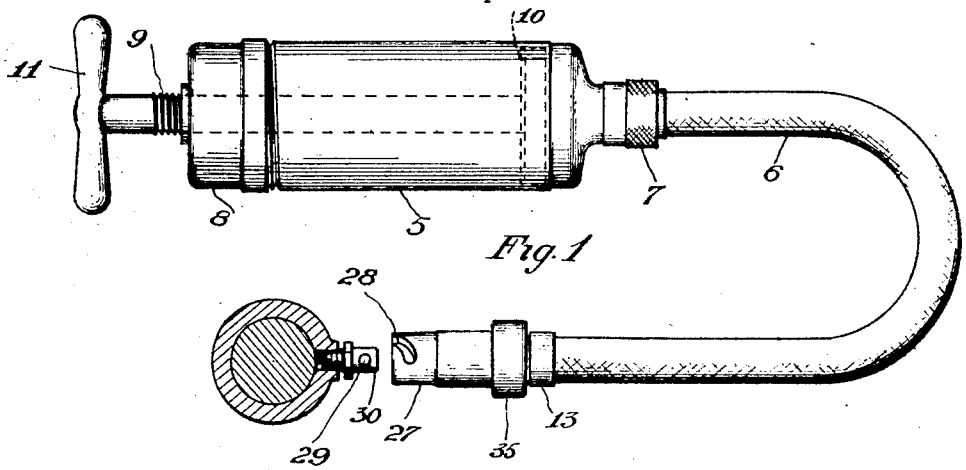
Fig.1
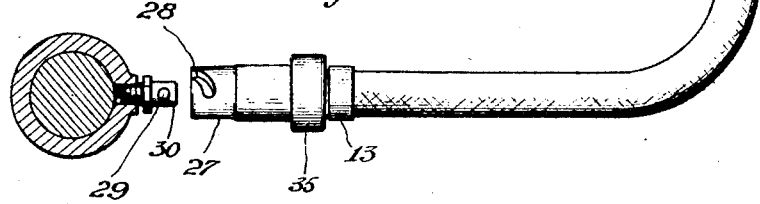
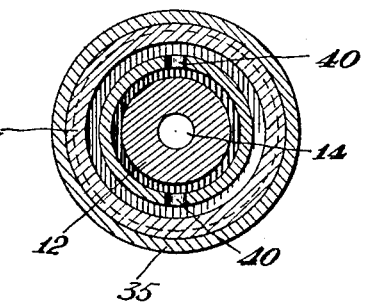
Fig.3
Fig.2
Inventor:  
Ernest W. Davis Patented Oct. 26, 1926.

1,604,392

UNITED STATES PATENT OFFICE.

ERNEST W. DAVIS, OF OAK PARK, ILLINOIS, ASSIGNOR TO BASSICK MANUFACTURING COMPANY, OF CHICAGO, ILLINOIS, A CORPORATION OF DELAWARE.

LUBRICANT COMPRESSOR.

Application filed April 27, 1923. Serial No. 634,969.

My invention relates to improvements in lubricant compressors, and is particularly concerned with the provision of a novel type of compressor adapted to form a part of a lubricating system, comprising a plurality of fittings or nipples adapted to be secured to the bearings to be lubricated, and a compressor for successively supplying lubricant under high pressure to said nipples or fittings.

The objects of my invention are:

First; to provide a compressor of the character described, by means of which the operator can easily and quickly exert sufficient pressure upon the lubricant requisite for forcing it into bearings having varying degrees of resistance to the passage of lubricant therethrough.

Second; to provide a compressor comprising means for delivering a comparatively large quantity of lubricant under comparatively high pressures, in combination with means which can be instantly brought into action for exerting still higher pressures upon the lubricant, so as to force it into a bearing having exceptionally high resistance.

Third; to provide a compressor of the character described, in which the high pressure means is normally inactive.

Fourth; to provide a compressor such as described, in which the high pressure means are actuated by a force exerted in a direction away from the lubricant receptacle fitting or nipple, and Fifth; to provide a compressor of the character described, which is simple in construction, economical to manufacture and easy to operate.

Other objects of my invention will appear as this description progresses, reference being had to the accompanying drawings, in which—

Figure 1 is a side elevation of my improved compressor;

Figure 2 is a central longitudinal section through the high pressure developing portions of my compressor; and Figure 3 is a transverse section taken on line 3—3 of Figure 2.

Throughout the several views, similar reference characters will be used for referring to similar parts.

The embodiment of my invention which I have illustrated herein, comprises a barrel 5 to one end of which is secured the flexible discharge conduit 6 by means of the swivel connection 7, and the other end of which is closed by means of a cap 8 which is detachably secured to the open end of the barrel by means of a suitable screw-threaded connection. A piston rod 9 is threaded through the end of the cap 8 and carries a piston 10 at its inner end and a suitable handle 11 at its outer end.

The construction thus far described is well known to those skilled in this art, and provides means for exerting very suitable pressure upon the lubricant contained in the barrel 5. The pressure which this portion of my compressor is able to produce is ordinarily sufficient to supply lubricant to most bearings, but with excessively tight bearings or where the lubricant has been permitted to cake or otherwise to become hardened, much higher pressures are required for displacing this lubricant so as to permit fresh lubricant to be supplied to the bearing.

The means which I have provided for increasing the pressure upon the lubricant whenever this is found to be desirable or necessary, comprises a plunger 12 (see Fig. 2 and Fig. 3), the outer end of which is cupped as shown at 13 to enable it to be soldered or otherwise secured to the outer end of the discharge conduit 6. The plunger 12 is provided with a bore 14 which connects with the discharge conduit, and which may be closed by means of a suitable check valve 15 located in the enlarged portion 14' of the bore of the cylinder and seating against a suitable valve seat 16 made of felt, leather, or other suitable material for effecting a tight joint at this point. The valve is yieldingly held against its seat by means of a spring 17, one end of which rests against the valve, and the other end of which abuts against the shoulder 18 formed in the bore of the plunger. For convenience in manufacturing and assembling, the plungers are made in two parts which are connected by screw threads as shown at 12'. The outer portion of the plunger is provided with a transverse bore 19 which communicates with the longitudinal bore 14. A cup leather 20 is secured to the outer end of the plunger 12 by means of the washer 21 and the screw 22, and makes sealed contact with the inner wall of the cylinder 23 which surrounds and loosely encloses the plunger. It will be noted from the inspection of Figures 2 and 3 that there is a small annular space 24 between the plunger and the cylinder 23. This space can be made as small as desired. An annular rib 25 formed on the outer end of the plunger provides means for guiding the plunger in the cylinder. The outer end of the cylinder is closed by means of a conical wall 26.

Surrounding the cylinder 23 and spaced therefrom, is a sleeve 27, the outer end of which is provided with oppositely disposed bayonet slots 28 for co-acting with the projecting ends of the pin 29 forming a part of the lubricant receptacle or fitting 30, which is adapted to be secured to a bearing to be lubricated. For sealing the connection between the sleeve 27 and the fitting. I provide a cup leather 31 which is yieldingly urged outwardly by means of the spring 32, one end of which bears against a washer 33 resting on the bottom of the cup leather, and the other end of which abuts against the conical end wall 26 of the cylinder. The shoulder 34 formed in the bore of the sleeve 27 limits the outward movement of the gasket 31.

For holding the cylinder 23 and the sleeve 27 in the proper assembled relation upon the plunger 12, I provide the inner end of the sleeve 27 with screw threads 34' adapted to co-act with similar threads on the gland 35, which has a central opening 36 for receiving the plunger 12. The inner end of the cylinder 23 has an outwardly extending flange 37 against which the inner end of the sleeve 27 abuts. A follower 38 is forced against the outwardly extending flange of the gasket 39, which tightly surrounds the plunger 12 so that when the gland 35 and the sleeve 27 are threaded together, the gasket 39 provides means for preventing the escape of lubricant along the piston, and the parts just described hold the cylinder and the sleeve in proper relation to the plunger.

The cylinder 23 is provided adjacent its inner end with a plurality of openings 40 extending through its wall for establishing communication between the annular space 24 and the annular space between the cylinder and the sleeve 27.

In the use of my improved compressor, the outer end of the sleeve 27 is connected with the fitting or nipple 30 in the manner shown in Figure 2, and the operator then turns the handle 11 so as to cause the piston 10 to move inwardly in the barrel 5 of the compressor, thereby subjecting the lubricant contained therein to pressure, and forcing it out of the barrel through the flexible conduit 6. From this conduit the lubricant passes through the bore 14, the transverse bores 19, the annular space 24, and the openings 40, into the space between the cylinder and the sleeve 27. Continued actuating of the handle 11 will cause the lubricant to flow outwardly through the last mentioned space, through the opening in the cup leather, and into the fitting.

Ordinarily, the pressures which the operator will be able to produce by turning the handle 11 will be sufficient to supply lubricant to most bearings. If, however, the operator finds that the resistance of any particular bearing is sufficient to make it difficult to supply lubricant thereto by turning the handle 11, he merely pulls upon the barrel of the compressor or the handle, or any other part thereof, so as to place the discharge conduit under tension. This force will cause the plunger 12 partially to be withdrawn from the cylinder, and as it is withdrawn it displaces lubricant from the cylinder out through the openings 40 and into the bearing, as previously described.

It will be apparent that the space between the plunger 12 and the cylinder 23 can be made as small as desired, so that any force exerted upon the plunger 12 will be distributed over a comparatively small area, and in this manner a comparatively small force exerted upon the plunger will exert a comparatively large pressure per unit area upon the lubricant. The resistance of the bearing having been overcome by use of the plunger, the operator can then continue to supply lubricant thereto by turning the handle 11. When sufficient lubricant has been supplied to the bearing, the operator turns the handle 11 in the reverse direction so as to relieve the pressure upon the lubricant. In withdrawing the plunger 12 from the cylinder 23, a vacuum is produced in the outer end of the cylinder, which vacuum tends to return the plunger and cylinder to their original and normal positions. If, however, the vacuum thus produced is not sufficient for this purpose, these elements will return to their normal positions as soon as the sleeve is connected to the next bearing and the piston actuated to place pressure upon the lubricant contained in the compressor. If the lubricant should leak past the cup leather 20 during the operation of the compressor, it is easily displaced from this position by placing a pressure upon the plunger, which tends to move it into the cylinder because the gasket offers practically no resistance to the passage of lubricant from the outer end of the cylinder to the space between the plunger and the cylinder.

I have discovered that the flexible conduit now extensively employed in lubricating systems of the character referred to herein, will withstand considerable longitudinal tension, and that it may be satisfactorily used for making the flexible conduit 6 of my apparatus. It is, however, to be understood that, if desired, a rigid conduit may be substituted for the flexible conduit.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a barrel, a piston in said barrel for exerting pressure on the lubricant therein, said barrel having a flexible discharge conduit, a plunger secured to the free end of said conduit, said plunger having a longitudinal bore communicating with said conduit, and being provided adjacent its outer end with a transverse bore communicating with said longitudinal bore, a cylinder loosely and slidably mounted upon said plunger, the outer end of said cylinder being closed, a piston carried by the outer end of said plunger and making sealed contact with the inner wall of said cylinder, and a sleeve rigidly mounted on said cylinder in spaced relation therewith, said cylinder having an opening communicating with said sleeve, the outer end of said sleeve being provided with means for making a sealed connection with a lubricant receptacle.

2. A lubricant compressor comprising a barrel, a piston slidable in said barrel, said barrel having a discharge conduit, a plunger secured to the free end of said conduit, said plunger having a longitudinal bore communicating with said conduit and being provided with a second bore communicating with said longitudinal bore, a cylinder loosely and slidably mounted upon said plunger, a piston carried by said plunger and making sealed contact with the inner wall of said cylinder, and a sleeve surrounding said cylinder, said cylinder having an opening communicating with said sleeve, the outer end of said sleeve being provided with means for making a sealed connection with a lubricant receptacle.

3. A lubricant compressor comprising a barrel, a piston in said barrel for exerting pressure on the lubricant therein, said barrel having a discharge conduit, a cylinder provided with means for establishing sealed communication with a lubricant receptacle, a piston in said cylinder, and means for connecting said piston and said discharge conduit so that a pull exerted upon said conduit away from said lubricant receptacle will place the lubricant in said cylinder under increased pressure.

4. A lubricant compressor comprising a barrel, means for exerting pressure on the lubricant in said barrel, a cylinder, a piston in said cylinder, a conduit for connecting said piston and barrel and establishing communication between said cylinder and barrel, and a sleeve surrounding said cylinder and provided with means for making a sealed connection with a lubricant receptacle.

5. A lubricant compressor comprising means for placing initial pressure upon the lubricant contained therein, means for making a sealed connection with the lubricant receptacle, and means intermediate said two first named means for increasing the pressure upon the lubricant by a force exerted in a direction away from said lubricant receptacle.

6. A lubricant compressor comprising a cylinder, means for making a sealed connection with a lubricant receptacle and for establishing communication between said cylinder and said lubricant receptacle, and means actuated by a force exerted in a direction away from said receptacle for placing the lubricant in said cylinder under pressure.

7. A lubricant compressor comprising a barrel, means for discharging the lubricant from said barrel under comparatively high pressure, means connecting with said barrel and communicating therewith for conducting lubricant from said barrel to a lubricant receptacle under pressure, said means comprising means which are normally inactive, but which become active whenever a force is exerted upon said compressor in a direction away from said lubricant receptacle for increasing the pressure upon the lubricant applied to said lubricant receptacle.

In witness whereof, I hereunto subscribe my name this 23d day of April, 1923.

ERNEST W. DAVIS.